US008188180B2

(12) United States Patent
Jonschker et al.

(10) Patent No.: US 8,188,180 B2
(45) Date of Patent: May 29, 2012

(54) BINDING AGENT

(75) Inventors: Gerhard Jonschker, Heppenheim (DE); Joerg Pahnke, Darmstadt (DE); Johanna Schuetz-Widoniak, Darmstadt (DE); Matthias Koch, Wiesbaden (DE)

(73) Assignee: Merck Patent Gesellschaft mit beschrankter Haftung, Darmstadt (DE)

( * ) Notice: Subject to any disclaimer, the term of this patent is extended or adjusted under 35 U.S.C. 154(b) by 293 days.

(21) Appl. No.: 12/527,720

(22) PCT Filed: Jan. 24, 2008

(86) PCT No.: PCT/EP2008/000532
§ 371 (c)(1),
(2), (4) Date: Aug. 19, 2009

(87) PCT Pub. No.: WO2008/101581
PCT Pub. Date: Aug. 28, 2008

(65) Prior Publication Data
US 2010/0120935 A1    May 13, 2010

(30) Foreign Application Priority Data

Feb. 20, 2007  (DE) .................. 10 2007 008 663

(51) Int. Cl.
*C08L 83/00* (2006.01)
*C08F 30/08* (2006.01)
*B32B 5/16* (2006.01)
*C08G 77/00* (2006.01)

(52) U.S. Cl. .................. 524/588; 525/326.5; 428/404; 521/154

(58) Field of Classification Search .................. 524/588; 525/326.5; 428/404; 521/154
See application file for complete search history.

(56) References Cited

U.S. PATENT DOCUMENTS

| | | | |
|---|---|---|---|
| 4,865,917 A * | 9/1989 | Lindner et al. ............... 428/407 |
| 6,252,014 B1 | 6/2001 | Knauss | |
| 7,081,234 B1 | 7/2006 | Qi et al. | |
| 2002/0106513 A1 | 8/2002 | Matyjaszewski et al. | |
| 2003/0220434 A1 | 11/2003 | Robello et al. | |
| 2004/0068038 A1 | 4/2004 | Robello et al. | |
| 2004/0241101 A1 | 12/2004 | Baran, Jr. et al. | |
| 2005/0192430 A1 * | 9/2005 | Rosenthal et al. ......... 530/391.3 |
| 2008/0248289 A1 | 10/2008 | Jonschker et al. | |
| 2009/0203838 A1 | 8/2009 | Koch et al. | |

FOREIGN PATENT DOCUMENTS

| | | |
|---|---|---|
| DE | 10 2005 056 621 A1 | 5/2007 |
| DE | 10 2005 056 622 A1 | 5/2007 |
| DE | 10 2006 012 467 A1 | 9/2007 |
| EP | 1 364 988 A1 | 11/2003 |
| WO | WO-2006 045713 | 5/2006 |

OTHER PUBLICATIONS

International Search Report of PCT/EP2008/000532 (May 27, 2008).
Sugimoto, Tadao, "Monodispersed Particles," 2001, pp. 422-427.

* cited by examiner

*Primary Examiner* — William Cheung
(74) *Attorney, Agent, or Firm* — Millen, White, Zelano & Branigan, P.C.

(57) ABSTRACT

The present invention relates to binders, to processes for the preparation thereof, and to the use thereof in formulations, surface coatings, inks and plastics.

21 Claims, No Drawings

BINDING AGENT

This application is a National Stage application of International Application No. PCT/EP2008/000532 filed Jan. 24, 2008, which claims benefits of Germany 10 2007 008 663.8 filed Feb. 20, 2007.

The present invention relates to binders, to processes for the preparation thereof, and to the use thereof in formulations, surface coatings, inks and plastics or precursors thereof.

In principle, the properties of surface coatings can be improved by addition of nanoparticles, but the processing of the nanoparticles represents a challenge since agglomeration and incompatibilities with common surface-coating components can easily occur. Furthermore, the additional introduction of a further surface-coating raw material is an undesired logistical complexity, which is associated with costs.

During curing of the surface coatings comprising nanoparticles, it is desired that the polymers should react with the nanoparticles with formation of covalent bonds. To this end, the nanoparticles must be provided with groups which are reactive towards the polymers used. The curing of the polymers with incorporation of the nanoparticles is generally carried out under conditions of rapidly increasing viscosity and thus decreasing mobility of the reactants.

Due to this circumstance and due to the steric screening of the nanoparticles by the first reacting polymer chains, the binding of the nanoparticles into the polymers is usually incomplete, and the desired property improvements do not arise to the desired and theoretically achievable extent or do not arise at all.

Due to the incomplete binding, the possible structural influence of the nanoparticles on the polymer chains is also reduced. Due to their large interfacial energy, nanoparticles have the property of forcing polymer chains in their immediate vicinity into an ordered structure. In the case of incomplete binding of the nanoparticles into the polymer structure, this desired effect cannot form to the full extent.

The solutions mentioned in the prior art are not capable of overcoming all of the above-mentioned disadvantages and providing a system which combines the said properties in a single component of the later application system. Thus, it is known, for example, from unpublished application DE 102006012467.7 that redispersible nanoparticles can be produced with polymers bonded via a sulfur bridge and employed as additive in surface coatings and inks in the amount range from 1 to usually 20% by weight. The principal component of these surface coatings and inks is furthermore conventional binders, which are able to crosslink with the nanoparticles on curing and are accompanied by all disadvantages of traditional binders.

The object of the present invention was accordingly to provide nanoparticle-containing systems which overcome the above-mentioned disadvantages.

Surprisingly, it has been found that binders of the present invention satisfy the complex requirement profile. Accordingly, the present invention relates firstly to the provision of binders comprising central linking points (called cores below) having a diameter of >1 nm with radially bonded oligomers and/or polymers. The oligomers and/or polymers are preferably covalently bonded to the surface of the cores. The proportion of oligomers and/or polymers in the binder is 40 to 99% by weight, preferably 70 to 90% by weight and in particular 80 to 95% by weight, based on the binder. The proportions are determined via thermogravimetric analysis (TGA), where the ignition residue (core fraction) of the dried binders is determined (instrument: TGA V4.OD Dupont 2000, heating rate: 10 K/min, temperature range 25-1000° C. in air, platinum crucible).

In general, the term "binder" for the purposes of the present invention means compounds which are responsible for film formation in coating materials and inks, for example printing inks. Film formation here stands as generic term for the transition of an applied coating material from the liquid or pulverulent state (with transition via the liquid phase) into the solid state. In the case of paints and surface coatings, binders are in accordance with DIN EN 971-1: 1996-09 and DIN 55945: 1999-07 the non-volatile fractions without pigment and filler, but including plasticisers, dryers and other non-volatile assistants, which are in some cases also applied from the melt (for example in the case of powder coating) or brought to reaction by radiation. Binders are in the form of a solution or dispersion in liquid coating materials; they ensure the anchoring of pigments and fillers in the film and adhesion of the film to the substrate.

For the purposes of the present invention, the term "radial" means a linear or branched, preferably linear alignment of the oligomers and/or polymers starting from a point. In the present invention, the core represents the point from which the oligomers and/or polymers are aligned with substantially no crosslinking.

In the case of the binders according to the invention, it is advantageous that the nanodimensioned cores have substantially reacted completely with the polymers with formation of covalent bonds even before the three-dimensional crosslinking in the film or in bulk, in order that good binding and crosslinking and a maximum effect on the polymer structure are achievable. This pre-crosslinking preferably takes place in a prior step under conditions which guarantee high reactivity with the particle surface and adequate mobility of the polymer chains. This can be achieved by various methods. The polymer/oligomer chains can be produced, for example, by polymerisation away from a core element.

The present invention accordingly furthermore relates to a process comprising the dispersal of cores having a diameter of >1 nm in a solvent or solvent mixture and polymerisation in the presence of organic monomers, where the oligomers and/or polymers formed are radially bonded to the cores.

Another way of preparing the binders according to the invention is reaction of correspondingly reactively modified polymer/oligomer chains with a core. Suitable for this purpose are preferably polymer/oligomer chains which have been terminally modified at one end or also polymer/oligomer chains which contain only one group which is reactive towards the core material. Accordingly, the present invention furthermore relates to a process for the preparation of the binders according to the invention comprising a) preparation or provision of oligomers and/or polymers containing a group which is reactive towards a core material b), b) dispersal of cores having a diameter of >1 nm in a solvent or solvent mixture in which the oligomers/polymers from a) are at least partially soluble, c) reaction, preferably chemical reaction, of the oligomers and/or polymers from a) with the cores from b), where the oligomers and/or polymers are radially bonded to the cores, d) if necessary work-up of the binder prepared in accordance with the invention by distillation, precipitation, solvent exchange, extraction or chromatography.

It is furthermore possible to produce the cores from correspondingly modified oligomers/polymers by a suitable reaction (for example hydrolysis/polycondensation). Suitable for this purpose are preferably hydrolysable silicon compounds which are terminally covalently bonded, such as, for example: trimethoxyorganosilanes. Accordingly, the present invention furthermore relates to a process comprising
a) preparation or provision of oligomers and/or polymers containing a hydrolysable and condensable organosilicon and/or organometallic group,
b) hydrolysis and condensation of the hydrolysable and condensable organosilicon and/or organometallic group, preferably under suitable conditions (for example in a suitable solvent/reactant mixture at a suitable temperature and pH and optionally catalysts which effect the formation of suitable cores), where cores with oligomers and/or polymers bonded thereto form, where the oligomers and/or polymers are radially bonded to the cores formed,
c) if necessary work-up of the binder prepared in accordance with the invention by distillation, precipitation, solvent exchange, extraction or chromatography.

The binders prepared in this way have a very advantageous star-like structure which is able to react during three-dimensional crosslinking to give a polymer nanocomposite with optimal binding of the nanoparticles. Due to the star-like structure, a very positive viscosity behaviour of the nanohybrid binders is achieved. Since the polymer chains are held together by a central linking point, the formation of large, freely unfolded polymer chains, as is the case in a conventional polymer solution, is suppressed. It is thus possible to produce polymer knots of very high molecular weight which have lower viscosity in solution compared with conventional polymers of the same molecular weight. This property is very desirable, in particular, in the surface-coatings industry since the restriction in the use of solvents has made it very difficult to formulate low-viscosity, readily processable surface coatings. For this reason, short-chain oligomers and reactive thinners are usually employed today, but these, as is known, result in surface coatings having lower mechanical and chemical resistance. The nanohybrid binders described in accordance with the invention offer an advantageous raw-material alternative here since they bring with them the advantages of high-molecular-weight polymers with low viscosity and low solvent requirement.

Due to the homogeneously incorporated nanoparticles, not only improvements in the structure and the mechanical/chemical properties are to be expected. Due to the incorporation of suitable nanoparticles, further improvements in properties are possible, for example increased UV stability by means of nanoscale UV absorbers or weathering-resistant inks through nanoscale pigments. It is also possible specifically to achieve scattering of short-wave light (UV) with retention of the transparency in the visible wavelength region through the choice of the size and refractive index of the cores.

In particular, a combination of a plurality of properties, such as, for example, scratch resistance and UV protection, could be interesting here.

Cores having a diameter of >1 nm are located in the centre of the binders according to the invention, where the cores may comprise inorganic or organic constituents or a mixture of inorganic and organic constituents. The cores are preferably inorganic.

The cores preferably have diameters, determined by means of a Malvern ZETASIZER (particle correlation spectroscopy, PCS) or transmitting electron microscope, of 1 to 20 nm in at least one dimension, preferably a maximum of 500 nm in a maximum of two dimensions, as, for example, in the case of phyllosilicates. Substantially round cores having a diameter of 1 to 25 nm, in particular 1 to 10 nm, are particularly preferred. For the purposes of the present invention, substantially round includes ellipsoidal and irregularly shaped cores. In specific, likewise preferred embodiments of the present invention, the distribution of the particle sizes is narrow, i.e. the variation latitude is less than 100% of the mean, particularly preferably a maximum of 50% of the mean.

Suitable cores can be nanoparticles produced separately or in a prior step, as are well known to the person skilled in the art, such as, for example: $SiO_2$, $ZrO_2$, $TiO_2$, $CeO_2$, ZnO, etc., but also three-dimensionally crosslinked organosilsesquioxane structures and metal oxides/hydroxides, in particular silsesquioxane structures (for example known under the trade name POSS™ from Hybrid Plastics), or heteropolysiloxanes, particularly cubic or other three-dimensional representatives of this class of materials. Hybrids of nanoparticles and silsesquioxane structures can likewise be employed as cores. Furthermore, cores based on phyllosilicates, sulfates, silicates, carbonates, nitrides, phosphates and sulfides of corresponding size can be employed in principle. A further suitable core material comprises cores selected from organic polymers/oligomers, in particular organic nanoparticles, for example consisting of free-radical-polymerised monomers. Dendrimers or hyperbranched polymers can in principle likewise serve as core material.

In addition, the core can also be built up in situ from suitable polymer chains. Preferably suitable for this purpose are terminally reactively modified polymers, which form the core or substantial parts of the core in a linking step. In particular, alkoxysilane-modified polymer chains, particularly preferably trialkoxysilane-modified polymer chains, are suitable for this purpose. The core formation in the case of these polymers is preferably carried out under reaction conditions which are suitable for the formation of spherical structures. In the case of silane modification, these are, in particular, basic reaction conditions, comparable to the Stöber synthesis known to the person skilled in the art. Besides alkoxysilanes, it is of course also possible for other suitable metal compounds, for example of Ti, Zr or Al, to be employed and reacted under conditions which are optimal for the respective species. The reaction can also be carried out in the presence of a preformed template (nucleus, nanoparticle, etc.) or other reactants (silanes, metal alkoxides or salts) in order to achieve the aim according to the invention.

Preferred cores are selected from the group consisting of hydrophilic and hydrophobic, in particular hydrophilic, cores based on sulfates or carbonates of alkaline-earth metal compounds or on oxides or hydroxides of silicon, titanium, zinc, aluminium, cerium, cobalt, chromium, nickel, iron, yttrium or zirconium or mixtures thereof, which may optionally be coated with metal oxides or hydroxides, for example of silicon, zirconium, titanium or aluminium, or metals, such as, for example, Ag, Cu, Fe, Au, Pd, Pt or alloys, coated with metal oxides or hydroxides, for example of silicon, zirconium, titanium or aluminium. The individual oxides may also be in the form of mixtures. The metal of the metal oxide or hydroxide is preferably silicon. The cores are particularly preferably selected from $SiO_2$ particles or they are selected from ZnO or cerium oxide particles or $TiO_2$ particles, which may optionally be coated with metal oxides or hydroxides, for example of silicon, zirconium, titanium or aluminium.

In the case of ZnO or cerium oxide particles as cores, the binders according to the invention can be employed as UV-absorbent binders owing to the absorption properties of zinc oxide or cerium oxide. Suitable zinc oxide particles having a particle size of 3 to 50 nm are obtainable, for example, by a process in which, in a step a), one or more precursors of the ZnO nanoparticles are converted into the nanoparticles in an organic solvent, and, in a step b), the growth of the nanoparticles is terminated by addition of at least one modifier, the precursor of silica, when the absorption edge in the UV/VIS spectrum of the reaction solution has reached the desired value. The process and the suitable modifiers and process parameters are described in DE 10 2005 056622.7.

Alternatively, suitable zinc oxide particles can be produced by a process in which, in a step a), one or more precursors of the ZnO nanoparticles are converted into the nanoparticles in an organic solvent, and, in a step b), the growth of the nanoparticles is terminated by addition of at least one copolymer comprising at least one monomer containing hydrophobic radicals and at least one monomer containing hydrophilic radicals when the absorption edge in the UV/VIS spectrum of the reaction solution has reached the desired value. This process and the suitable copolymers, monomers and process parameters are described in DE 10 2005 056621.9.

It is also possible to use nanohectorites, which are marketed, for example, by Südchemie under the Optigel® brand or by Laporte under the Laponite® brand. Very particular preference is also given to silica sols ($SiO_2$ in water), prepared from ion-exchanged water-glass (for example Levasile® from H.C. Starck) or dispersions of particles deposited from the gas phase, such as, for example: Aerosil® from Degussa or Nanopure® from SDC.

If the core does not already have high reactivity and the possibility of the formation of covalent bonds to the oligomers/polymers, it is advantageous to apply an adhesion promoter or another suitable surface modification.

Accordingly, in a further embodiment of the present invention, the surface of the cores has been modified by means of at least one surface modifier. These are, for example, organofunctional silanes, organometallic compounds, such as, for example, zirconium tetra-n-propoxide, or mixtures or polyfunctional organic molecules which have optimised reactivity towards the core material and the oligomers/polymers to be connected thereto.

The surface modification is preferably chemical, i.e. the bonding takes place via hydrogen bonds, electrostatic interactions, chelate bonds or via covalent bonds. The surface modifier is preferably covalently bonded to the surface of the core.

The at least one surface modifier is preferably selected from the group consisting of organofunctional silanes, quaternary ammonium compounds, carboxylic acids, phosphonates, phosphonium and sulfonium compounds and mixtures thereof. At least one surface modifier particularly preferably contains at least one functional group selected from the group consisting of thiols, sulfides, disulfides and polysulfides.

Common processes for the production of surface-modified nanoparticles start from aqueous particle dispersions, to which the surface modifier is added. However, the reaction with the surface modifiers can also be carried out in an organic solvent or in solvent mixtures. This applies, in particular, to ZnO nanoparticles. Preferred solvents are alcohols or ethers, where the use of methanol, ethanol, diethyl ether, tetrahydrofuran and/or dioxane or mixtures thereof is particularly preferred. Methanol has proven to be a particularly suitable solvent. If desired, assistants, such as, for example, surfactants or protective colloids (for example hydroxypropylcellulose), may also be present during the reaction.

The surface modifiers can be employed alone, as mixtures or mixed with further, optionally non-functional surface modifiers.

The surface modifier requirements described are satisfied, in particular, in accordance with the invention by an adhesion promoter which carries two or more functional groups. One group of the adhesion promoter reacts chemically with the oxide surface of the nanoparticle. Particularly suitable here are alkoxysilyl groups (for example methoxy- and ethoxysilanes), halosilanes (for example chlorosilanes) or acidic groups of phosphonic acid esters or phosphonic acids and phosphonic acid esters or carboxylic acids. The groups described are linked to a second functional group via a more or less long spacer. This spacer comprises non-reactive alkyl chains, siloxanes, polyethers, thioethers or urethanes or combinations of these groups of the general formula $(C,Si)_n H_m (N,O,S)_x$, where n=1-50, m=2-100 and x=0-50. The functional group is preferably a thiol, sulfide, polysulfide, in particular tetrasulfide, or disulfide group.

Besides the thiol, sulfide, polysulfide or disulfide groups, the adhesion promoter described above may contain further functional groups. The additional functional groups are, in particular, acrylate, methacrylate, vinyl, amino, cyano, isocyanate, epoxide, carboxyl or hydroxyl groups.

Silane-based surface modifiers are described, for example, in DE 40 11 044 C2. Surface modifiers based on phosphoric acid are obtainable, inter alia, as Lubrizol® 2061 and 2063 from LUBRIZOL (Langer & Co.). A suitable silane is, for example, mercaptopropyltrimethoxysilane. This and other silanes are commercially available, for example from ABCR GmbH & Co., Karlsruhe, or Degussa, Germany, under the trade name Dynasilan. Mercaptophosphonic acid or diethyl mercaptophosphonate may also be mentioned here as adhesion promoter.

Alternatively, the surface modifier can be an amphiphilic silane of the general formula $(R)_3 Si$—$S_P$-$A_{hp}$-$B_{hb}$, where the radicals R may be identical or different and represent hydrolytically removable radicals, Sp denotes either —O— or straight-chain or branched alkyl having 1-18 C atoms, straight-chain or branched alkenyl having 2-18 C atoms and one or more double bonds, straight-chain or branched alkynyl having 2-18 C atoms and one or more triple bonds, saturated, partially or fully unsaturated cycloalkyl having 3-7 C atoms, which may be substituted by alkyl groups having 1-6 C atoms, $A_{hp}$ denotes a hydrophilic block, $B_{hb}$ denotes a hydrophobic block, and where at least one thiol, sulfide or disulfide group on $A_{hp}$ and/or $B_{hb}$ is in bonded form. The use of amphiphilic silanes gives rise to nanoparticles which can be redispersed particularly well, both in polar and in nonpolar solvents.

The amphiphilic silanes contain a head group $(R)_3 Si$, where the radicals R may be identical or different and represent hydrolytically removable radicals. The radicals R are preferably identical.

Suitable hydrolytically removable radicals are, for example, alkoxy groups having 1 to 10 C atoms, preferably having 1 to 6 C atoms, halogens, hydrogen, acyloxy groups having 2 to 10 C atoms and in particular having 2 to 6 C atoms or $NR'_2$ groups, where the radicals R' may be identical or different and are selected from hydrogen and alkyl having 1 to 10 C atoms, in particular having 1 to 6 C atoms. Suitable alkoxy groups are, for example, methoxy, ethoxy, propoxy or butoxy groups. Suitable halogens are, in particular, Br and Cl. Examples of acyloxy groups are acetoxy and propoxy groups. Oximes are furthermore also suitable as hydrolytically removable radicals. The oximes here may be substituted by hydrogen or any desired organic radicals. The radicals R are preferably alkoxy groups and in particular methoxy or ethoxy groups.

A spacer $S_P$ is covalently bonded to the above-mentioned head group and functions as connecting element between the Si head group and the hydrophilic block $A_{hp}$ and takes on a bridge function for the purposes of the present invention. The group $S_P$ is either —O— or straight-chain or branched alkyl having 1-18 C atoms, straight-chain or branched alkenyl having 2-18 C atoms and one or more double bonds, straight-chain or branched alkynyl having 2-18 C atoms and one or more triple bonds, saturated, partially or fully unsaturated cycloalkyl having 3-7 C atoms, which may be substituted by alkyl groups having 1-6 C atoms.

The $C_1$-$C_{18}$-alkyl group of $S_P$ is, for example, a methyl, ethyl, isopropyl, propyl, butyl, sec-butyl or tert-butyl, furthermore also pentyl, 1-, 2- or 3-methylbutyl, 1.1-, 1.2- or 2.2-dimethylpropyl, 1-ethylpropyl, hexyl, heptyl, octyl, nonyl, decyl, undecyl, dodecyl, tridecyl or tetradecyl group. It may optionally be perfluorinated, for example as difluoromethyl, tetrafluoroethyl, hexafluoropropyl or octafluorobutyl group.

A straight-chain or branched alkenyl having 2 to 18 C atoms, in which a plurality of double bonds may also be present, is, for example, vinyl, allyl, 2- or 3-butenyl, isobutenyl, sec-butenyl, furthermore 4-pentenyl, isopentenyl, hexenyl, heptenyl, octenyl, —$C_9H_{16}$, —$C_{10}H_{18}$ to —$C_{18}H_{34}$, preferably allyl, 2- or 3-butenyl, isobutenyl, sec-butenyl, furthermore preferably 4-pentenyl, isopentenyl or hexenyl.

A straight-chain or branched alkynyl having 2 to 18 C atoms, in which a plurality of triple bonds may also be present, is, for example, ethynyl, 1- or 2-propynyl, 2- or 3-butynyl, furthermore 4-pentynyl, 3-pentynyl, hexynyl, heptynyl, octynyl, —$C_9H_{14}$, —$C_{10}H_{16}$ to —$C_{18}H_{32}$, preferably ethynyl, 1- or 2-propynyl, 2- or 3-butynyl, 4-pentynyl, 3-pentynyl or hexynyl.

Unsubstituted saturated or partially or fully unsaturated cycloalkyl groups having 3-7 C atoms can be cyclopropyl, cyclobutyl, cyclopentyl, cyclohexyl, cycloheptyl, cyclopentenyl, cyclopenta-1.3-dienyl, cyclohexenyl, cyclohexa-1.3-dienyl, cyclohexa-1.4-dienyl, phenyl, cycloheptenyl, cyclohepta-1.3-dienyl, cyclohepta-1.4-dienyl or cyclohepta-1.5-dienyl groups, which are substituted by $C_1$- to $C_6$-alkyl groups.

The spacer group $S_P$ is connected to the hydrophilic block $A_{hp}$. The latter can be selected from nonionic, cationic, anionic and zwitterionic hydrophilic polymers, oligomers and groups. In the simplest embodiment, the hydrophilic block comprises ammonium, sulfonium or phosphonium groups, alkyl chains containing carboxyl, sulfate or phosphate side groups, which may also be in the form of a corresponding salt, partially esterified anhydrides containing a free acid or salt group, OH-substituted alkyl or cycloalkyl chains (for example sugars) containing at least one OH group, NH- and SH-substituted alkyl or cycloalkyl chains or mono-, di-, tri- or oligoethylene glycol groups. The length of the corresponding alkyl chains can be 1 to 20 C atoms, preferably 1 to 6 C atoms.

The nonionic, cationic, anionic or zwitterionic hydrophilic polymers, oligomers or groups here can be prepared from corresponding monomers by polymerisation by the methods which are generally known to the person skilled in the art. Suitable hydrophilic monomers here contain at least one dispersing functional group selected from the group consisting of
(i) functional groups which can be converted into anions by neutralisers, and anionic groups, and/or
(ii) functional groups which can be converted into cations by neutralisers and/or quaternising agents, and cationic groups, and/or
(iii) nonionic hydrophilic groups.

The functional groups (i) are preferably selected from the group consisting of carboxyl, sulfonyl and phosphonyl groups, acidic sulfuric acid and phosphoric acid ester groups and carboxylate, sulfonate, phosphonate, sulfate ester and phosphate ester groups, the functional groups (ii) are preferably selected from the group consisting of primary, secondary and tertiary amino groups, primary, secondary, tertiary and quaternary ammonium groups, quaternary phosphonium groups and tertiary sulfonium groups, and the functional groups (iii) are preferably selected from the group consisting of omega-hydroxy- and omega-alkoxypoly(alkylene oxide)-1-yl groups.

If not neutralised, the primary and secondary amino groups can also serve as isocyanate-reactive functional groups.

Examples of highly suitable hydrophilic monomers containing functional groups (i) are acrylic acid, methacrylic acid, beta-carboxyethyl acrylate, ethacrylic acid, crotonic acid, maleic acid, fumaric acid and itaconic acid; olefinically unsaturated sulfonic and phosphonic acids and partial esters thereof; and mono(meth)acryloyloxyethyl maleate, mono(meth)acryloyloxyethyl succinate and mono(meth)acryloyloxyethyl phthalate, in particular acrylic acid and methacrylic acid.

Examples of highly suitable hydrophilic monomers containing functional groups (ii) are 2-aminoethyl acrylate and methacrylate and allylamine.

Examples of highly suitable hydrophilic monomers containing functional groups (iii) are omega-hydroxy- and omega-methoxypoly(ethylene oxide)-1-yl, omega-methoxypoly(propylene oxide)-1-yl and omega-methoxypoly(ethylene oxide-co-polypropylene oxide)-1-yl acrylate and methacrylate, and hydroxyl-substituted ethylenes, acrylates and methacrylates, such as, for example, hydroxyethyl methacrylate.

Examples of suitable monomers for the formation of zwitterionic hydrophilic polymers are those in which a betaine structure occurs in the side chain. The side group is preferably selected from —$(CH_2)_m$—$(N^+(CH_3)_2)$—$(CH_2)_n$—$SO_3^-$, —$(CH_2)_m$—$(N^+(CH_3)_2)$—$(CH_2)_n$—$PO_3^{2-}$, —$(CH_2)_m$—$(N^+(CH_3)_2)$—$(CH_2)_n$—$O$—$PO_3^{2-}$ and —$(CH_2)_m$—$(P^+(CH_3)_2)$—$(CH_2)_n$—$SO_3^-$, where m stands for an integer from the range 1 to 30, preferably from the range 1 to 6, particularly preferably 2, and n stands for an integer from the range 1 to 30, preferably from the range 1 to 8, particularly preferably 3.

It may be particularly preferred here for at least one structural unit of the hydrophilic block to contain a phosphonium or sulfonium radical.

When selecting the hydrophilic monomers, it should be ensured that the hydrophilic monomers containing functional groups (i) and the hydrophilic monomers containing functional groups (ii) are preferably combined with one another in such a way that no insoluble salts or complexes are formed. By contrast, the hydrophilic monomers containing functional groups (i) or containing functional groups (ii) can be combined as desired with the hydrophilic monomers containing functional groups (iii).

Of the hydrophilic monomers described above, the monomers containing functional groups (i) are particularly preferably used.

The neutralisers for the functional groups (i) which can be converted into anions are preferably selected here from the group consisting of ammonia, trimethylamine, triethylamine, tributylamine, dimethylaniline, diethylaniline, triphenylamine, dimethylethanolamine, diethylethanolamine, methyldiethanolamine, 2-aminomethylpropanol, dimethylisopropylamine, dimethyl-isopropanolamine, triethanolamine, diethylenetriamine and triethylenetetramine, and the neutralisers for the functional groups (ii) which can be converted into cations are preferably selected from the group consisting of sulfuric acid, hydrochloric acid, phosphoric acid, formic acid, acetic acid, lactic acid, dimethylolpropionic acid and citric acid.

The hydrophilic block is very particularly preferably selected from mono-, di- and triethylene glycol structural units.

The hydrophobic block $B_{hb}$ follows bonded to the hydrophilic block $A_{hp}$. The block $B_{hb}$ is based on hydrophobic groups or, like the hydrophilic block, on hydrophobic monomers which are suitable for polymerisation.

Examples of suitable hydrophobic groups are straight-chain or branched alkyl having 1-18 C atoms, straight-chain or branched alkenyl having 2-18 C atoms and one or more double bonds, straight-chain or branched alkynyl having 2-18 C atoms and one or more triple bonds, saturated, partially or fully unsaturated cycloalkyl having 3-7 C atoms, which may be substituted by alkyl groups having 1-6 C atoms. Examples of such groups have already been mentioned above. In addition, aryl, polyaryl, aryl-$C_1$-$C_6$-alkyl or esters having more than 2 C atoms are suitable. The said groups may, in addition, also be substituted, in particular by halogens, where perfluorinated groups are particularly suitable.

Aryl-$C_1$-$C_6$-alkyl denotes, for example, benzyl, phenylethyl, phenylpropyl, phenylbutyl, phenylpentyl or phenylhexyl, where both the phenyl ring and also the alkylene chain may be partially or fully substituted by F as described above, particularly preferably benzyl or phenylpropyl.

Examples of suitable hydrophobic olefinically unsaturated monomers for the hydrophobic block $B_{hb}$ are (1) esters of olefinically unsaturated acids which are essentially free from acid groups, such as alkyl or cycloalkyl esters of (meth)acrylic acid, crotonic acid, ethacrylic acid, vinylphosphonic acid or vinylsulfonic acid having up to 20 carbon atoms in the alkyl radical, in particular methyl, ethyl, propyl, n-butyl, sec-butyl, tert-butyl, hexyl, ethylhexyl, stearyl or lauryl acrylate, methacrylate, crotonate, ethacrylate or vinylphosphonate or vinylsulfonate; cycloaliphatic esters of (meth)acrylic acid, crotonic acid, ethacrylic acid, vinylphosphonic acid or vinylsulfonic acid, in particular cyclohexyl, isobornyl, dicyclopentadienyl, octahydro-4.7-methano-1H-indenemethanol or tert-butylcyclohexyl (meth)acrylate, crotonate, ethacrylate, vinylphosphonate or vinylsulfonate. These may comprise minor amounts of polyfunctional alkyl or cycloalkyl esters of (meth)acrylic acid, crotonic acid or ethacrylic acid, such as ethylene glycol, propylene glycol, diethylene glycol, dipropylene glycol, butylene glycol, pentane-1.5-diol, hexane-1.6-diol, octahydro-4.7-methano-1H-indenedimethanol or cyclohexane-1, 2-, -1,3- or -1.4-diol di(meth)acrylate, trimethylolpropane tri(meth)acrylate or pentaerythritol tetra(meth)acrylate, and the analogous ethacrylates or crotonates. For the purposes of the present invention, minor amounts of polyfunctional monomers (1) are taken to mean amounts which do not result in crosslinking or gelling of the polymers;

(2) monomers which carry at least one hydroxyl group or hydroxymethylamino group per molecule and are essentially free from acid groups, such as hydroxyalkyl esters of alpha,beta-olefinically unsaturated carboxylic acids, such as hydroxyalkyl esters of acrylic acid, methacrylic acid and ethacrylic acid, in which the hydroxyalkyl group contains up to 20 carbon atoms, such as 2-hydroxyethyl, 2-hydroxypropyl, 3-hydroxypropyl, 3-hydroxybutyl, 4-hydroxybutyl acrylate, methacrylate or ethacrylate; 1.4-bis(hydroxymethyl)cyclohexane, octahydro-4.7-methano-1H-indenedimethanol or methylpropanediol monoacrylate, monomethacrylate, monoethacrylate or monocrotonate; or products of the reaction of cyclic esters, such as, for example, epsilon-caprolactone, and these hydroxyalkyl esters;

olefinically unsaturated alcohols, such as allyl alcohol;

allyl ethers of polyols, such as trimethylolpropane monoallyl ether or pentaerythritol mono-, -1- or triallyl ether. The polyfunctional monomers are generally only used in minor amounts. For the purposes of the present invention, minor amounts of polyfunctional monomers are taken to mean amounts which do not result in crosslinking or gelling of the polymers;

products of the reaction of alpha,beta-olefinically unsaturated carboxylic acids with glycidyl esters of an alpha-branched monocarboxylic acid having 5 to 18 carbon atoms in the molecule. The reaction of acrylic or methacrylic acid with the glycidyl ester of a carboxylic acid containing a tertiary alpha-carbon atom can take place before, during or after the polymerisation reaction. The monomer (2) employed is preferably the product of the reaction of acrylic and/or methacrylic acid with the glycidyl ester of Versatic® acid. This glycidyl ester is commercially available under the name Cardura® E10. Reference is additionally made to Römpp Lexikon Lacke and Druckfarben [Römpp's Lexicon of Surface Coatings and Printing Inks], Georg Thieme Verlag, Stuttgart, New York, 1998, pages 605 and 606;

formaldehyde adducts of aminoalkyl esters of alpha,beta-olefinically unsaturated carboxylic acids and of alpha, beta-unsaturated carboxamides, such as N-methylol- and N,N-dimethylolaminoethyl acrylate, -aminoethyl methacrylate, -acrylamide and -methacrylamide; and olefinically unsaturated monomers containing acryloxysilane groups and hydroxyl groups, which can be prepared by reaction of hydroxyl-functional silanes with epichlorohydrin 30 and subsequent reaction of the intermediate with an alpha,beta-olefinically unsaturated carboxylic acid, in particular acrylic acid and methacrylic acid, or hydroxyalkyl esters thereof;

(3) vinyl esters of alpha-branched monocarboxylic acids having 5 to 18 carbon atoms in the molecule, such as the vinyl esters of Versatic® acid, which are marketed under the VeoVa® brand;

(4) cyclic and/or acyclic olefins, such as ethylene, propylene, but-1-ene, pent-1-ene, hex-1-ene, cyclohexene, cyclopentene, norbornene, butadiene, isoprene, cyclopentadiene and/or dicyclopentadiene;

(5) amides of alpha,beta-olefinically unsaturated carboxylic acids, such as (meth)acrylamide, N-methyl-, N,N-dimethyl-, N-ethyl-, N,N-diethyl-, N-propyl-, N,N-dipropyl-, N-butyl-, N,N-dibutyl- and/or N,N-cyclohexylmethyl(meth)acrylamide;

(6) monomers containing epoxide groups, such as the glycidyl esters of acrylic acid, methacrylic acid, ethacrylic acid, crotonic acid, maleic acid, fumaric acid and/or itaconic acid;

(7) vinylaromatic hydrocarbons, such as styrene, vinyltoluene or alpha-alkylstyrenes, in particular alpha-methylstyrene;

(8) nitriles, such as acrylonitrile or methacrylonitrile;

(9) vinyl compounds, selected from the group consisting of vinyl halides, such as vinyl chloride, vinyl fluoride, vinylidene dichloride, vinylidene difluoride; vinylamides, such as N-vinylpyrrolidone; vinyl ethers, such as ethyl vinyl ether, n-propyl vinyl ether, isopropyl vinyl ether, n-butyl vinyl ether, isobutyl vinyl ether and vinyl cyclohexyl ether; and vinyl esters, such as vinyl acetate, vinyl propionate and vinyl butyrate;

(10) allyl compounds, selected from the group consisting of allyl ethers and esters, such as propyl allyl ether, butyl allyl ether, ethylene glycol diallyl ether, trimethylolpropane triallyl ether or allyl acetate or allyl propionate; as far as the polyfunctional monomers are concerned, that stated above applies analogously;

(11) siloxane or polysiloxane monomers, which may be substituted by saturated, unsaturated, straight-chain or branched alkyl groups or other hydrophobic groups already mentioned above. Also suitable are polysiloxane macromonomers which have a number average molecular weight Mn of 1000 to 40.000 and contain on average 0.5 to 2.5 ethylenically unsaturated double bonds per molecule, in particular polysiloxane macromonomers which have a number average molecular weight Mn of 2000 to 20.000, particularly preferably 2500 to 10.000 and in particular 3000 to 7000, and contain on average 0.5 to 2.5, preferably 0.5 to 1.5, ethylenically unsaturated double bonds per molecule, as described in DE 38 07 571 A 1 on pages 5 to 7, DE 37 06 095 A 1 in columns 3 to 7, EP 0 358 153 B 1 on pages 3 to 6, in U.S. Pat. No. 4,754,014 A 1 in columns 5 to 9, in DE 44 21 823 A 1 or in International Patent Application WO 92/22615 on page 12, line 18, to page 18, line 10; and

(12) monomers containing carbamate or allophanate groups, such as acryloyloxy- or methacryloyloxyethyl, -propyl or -butyl carbamate or allophanate; further examples of suitable monomers which contain carbamate groups are described in the patent specifications U.S. Pat. No. 3,479,328 A 1, U.S. Pat. No. 3,674,838 A 1, U.S. Pat. No. 4,126,747 A 1, U.S. Pat. No. 4,279,833 A 1 or U.S. Pat. No. 4,340,497 A 1.

The polymerisation of the above-mentioned monomers can be carried out in any way known to the person skilled in the art, for example by polyadditions or cationic, anionic or free-radical polymerisations. Polyadditions are preferred in this connection since different types of monomer can thus be combined with one another in a simple manner, such as, for example, epoxides with dicarboxylic acids or isocyanates with diols.

The respective hydrophilic and hydrophobic blocks can in principle be combined with one another in any desired manner. The amphiphilic silanes in accordance with the present invention preferably have an HLB value in the range 2-19, preferably in the range 4-15. The HLB value is defined here as $$HLB = \frac{\text{mass of polar fractions}}{\text{molecular weight}} \cdot 20$$

and indicates whether the silane has more hydrophilic or hydrophobic behaviour, i.e. which of the two blocks $A_{hp}$ and $B_{hb}$ dominates the properties of the silane according to the invention. The HLB value is calculated theoretically and arises from the mass fractions of hydrophilic and hydrophobic groups. An HLB value of 0 indicates a lipophilic compound, a chemical compound having an HLB value of 20 has only hydrophilic fractions.

The suitable amphiphilic silanes are furthermore distinguished by the fact that at least one thiol, sulfide or disulfide group is advantageously bonded to $A_{hp}$ and/or $B_{hb}$. The reactive functional group is preferably located on the hydrophobic block $B_{hb}$, where it is particularly preferably bonded at the end of the hydrophobic block. In the preferred embodiment, the head group $(R)_3Si$ and the thiol, sulfide or disulfide group have the greatest possible separation. This enables particularly flexible setting of the chain lengths of blocks $A_{hp}$ and $B_{hb}$ without significantly restricting the possible reactivity of the thiol, sulfide or disulfide group, for example with the ambient medium.

In addition, besides the thiol, sulfide, polysulfide or disulfide group, further reactive functional groups may be present, in particular selected from silyl groups containing hydrolytically removable radicals, OH, carboxyl, NH and SH groups, halogens or reactive groups containing double bonds, such as, for example, acrylate or vinyl groups. Suitable silyl groups containing hydrolytically removable radicals have already been described above in the description of the head group $(R)_3Si$. The additional reactive group is preferably an OH group.

In the binders according to the invention, oligomers and/or polymers are radially bonded to the cores. The polymer or oligomer chains can be brought to reaction with the core material by all processes known to the person skilled in the art in order preferably to form at least one covalent bond.

The present invention thus furthermore relates to a process for the preparation of the binders according to the invention, comprising the dispersal of cores having a diameter of >1 nm in a solvent or solvent mixture and polymerisation in the presence of organic monomers, where the oligomers and/or polymers formed are preferably radially bonded to the cores. It is desirable here that the oligomer/polymer only reacts with the core material by means of one reaction centre per polymer/oligomer chain, and it is particularly preferred that this reaction centre is positioned terminally on the polymer chain. Use can be made here of both polymers/oligomers formed in a prior step or in an external reaction, and also polymers/oligomers formed in situ during the covalent bonding to the core material. This may be the case, for example, during a free-radical polymerisation with unsaturated monomers in the presence of the core material, which has preferably been correspondingly (SH) surface-modified. Owing to the steric hindrance of the polymers/oligomers with one another, it may generally be advantageous for the polymers to be formed starting from the core material and not subsequently bonded to the core. The polymerisation away from the core thus enables, if desired, substantially complete and dense coverage of the core material with polymer to be ensured. The formation of the polymer chain can take place via various chain-growth reactions known to the person skilled in the art. Mention may be made here by way of example of ionic polymerisations (starting from epoxide functions or halogenated aromatic compounds) and free-radical polymerisations, where the latter are preferred since they can also be carried out in aqueous environments.

The synthesis of the polymers and/or oligomers can be carried out by chain-growth reactions known to the person skilled in the art, where the chains are initiated or terminated by means of a reactive group which is able to react with the particle surface. Mention may be made here by way of example of anionic polymerisation and controlled and free-radical polymerisation.

In a further preferred case, the core material is formed during the covalent linking of the polymer/oligomer chains. To this end, use is preferably made of polymers/oligomers which have been terminally modified by means of hydrolysable/condensable organosilane or organometallic compounds and which are reacted in a hydrolysis and polymerisation (also in the presence of further organosilicon and organometallic compounds) to give a core material. Typical oligomers/polymers according to the invention are, for example: trialkoxysilylmercaptopropyl-terminated polyacrylates, which are obtainable, for example, by free-radical polymerisation of one or more unsaturated compounds with mercaptopropyltrialkoxysilane as chain-transfer agent or bis[3-trimethoxysilylpropyl]disulfide as initiator. Preference is furthermore also given to the use of the products of the reaction of terminally OH-modified polyesters or polyethers with isocyanatoalkyltrialkoxysilane. Alternatively, it is also possible to employ polymers containing a hydrolysable silyl compound in the polymer chain, which then achieves linking of two oligomer/polymer strands via a connecting element. Oligomers/polymers of this type are obtainable, for example, by free-radical polymerisation of unsaturated compounds in the presence of methacryloxypropyltrimethoxysilane.

Besides organosilyl and organometallic reaction centres, it is also possible to employ suitable organic reaction centres, such as, for example, amine, epoxide, hydroxyl, mercapto, isocyanate, carboxylate, allyl or vinyl groups, for reaction with suitable reactants on the core material side. For example, an epoxide-functional core material is able to react with an amino-functional polymer or an amine-modified core material is able to react with an isocyanate-functional polymer/oligomer.

The polymers/oligomers can be composed of all known polymeric substance groups, or mixtures thereof. In particular, the oligomers and/or polymers are selected from the group consisting of poly(meth)acrylates, polyesters, polyurethanes, polyureas, silicones, polyethers, polyamides, polyimides and mixtures and hybrids thereof.

Examples of highly suitable monomers for the formation of corresponding oligomers and/or polymers containing functional groups are acrylic acid, methacrylic acid, beta-carboxyethyl acrylate, ethacrylic acid, crotonic acid, maleic acid, fumaric acid and itaconic acid; olefinically unsaturated sulfonic or phosphonic acids and partial esters thereof; and mono(meth)acryloyloxyethyl maleate, mono(meth)acryloyloxyethyl succinate and mono(meth)acryloyloxyethyl phthalate, in particular acrylic acid and methacrylic acid. Further examples of highly suitable monomers containing functional groups are 2-aminoethyl acrylate and methacrylate and allylamine.

Further suitable monomers containing functional groups are omega-hydroxy- and omega-methoxypoly(ethylene oxide)-1-yl, omega-methoxypoly(propylene oxide)-1-yl and omega-methoxypoly(ethylene oxide-co-polypropylene oxide)-1-yl acrylate and methacrylate, and hydroxyl-substituted ethylenes, acrylates and methacrylates, such as, for example, hydroxyethyl methacrylate and hydroxypropyl methacrylate.

Examples of suitable monomers for the formation of zwitterionic hydrophilic polymers are those in which a betaine structure occurs in the side chain. The side group is preferably selected from $-(CH_2)_m-(N^+(CH_3)_2)-(CH_2)_n-SO_3^-$, $-(CH_2)_m-(N^+(CH_3)_2)-(CH_2)_n-PO_3^{2-}$, $-(CH_2)_m-(N^+(CH_3)_2)-(CH_2)_n-O-PO_3^{2-}$ and $-(CH_2)_m-(P^+(CH_3)_2)-(CH_2)_n-SO_3^-$, where m stands for an integer from the range 1 to 30, preferably from the range 1 to 6, particularly preferably 2, and n stands for an integer from the range 1 to 30, preferably from the range 1 to 8, particularly preferably 3.

At least three and particularly preferably at least six polymer/oligomer chains are covalently bonded per core. The maximum number of polymer/oligomer chains bonded to a core is limited only by the technical feasibility and preparation ability.

The polymers consist of a monomer or (preferably) of monomer mixtures. The monomers can preferably also carry reactive groups in the side chains, such as, for example, hydroxyl, epoxide, allyl, blocked isocyanate, etc. Furthermore, the side chains may additionally have a functional structure: for example hydroxybenzophenone, benzotriazole as UV absorber or fluorescent dyes, which are incorporated into the polymer chain via acrylate function.

The polymer/oligomer sheath is preferably reactive towards further components of the surface coatings, such as, for example, crosslinking agents (in particular isocyanate or melamine crosslinking agents), or curable by input of energy (for example UV light, electron beam curing or heat), for example by means of blocked isocyanates present.

To this end, it is desired that the polymers bonded to the core material contain further reactive groups with which they are subsequently able to react to give a three-dimensionally crosslinked polymer. These can be, for example, unsaturated groups, such as acrylic or vinyl, or also groups which are able to react with an external crosslinking agent, such as, for example, epoxide groups, NH, COOH, alkoxysilyl or OH groups, which may be crosslinked with isocyanates. The functional group is in particular an OH group.

In a preferred embodiment of the present invention, the surface of the cores is coated with at least one surface modifier which contains at least one functional group selected from the group consisting of thiols, sulfides, disulfides and polysulfides. The cores modified in this way are then reacted, in a second step, in a free-radical polymerisation in the presence of organic monomers, where the surface modifier applied in the first step functions as free-radical chain-transfer agent. A polymer chain growing by means of free radicals can, for example, abstract the hydrogen from an SH group and thus generates a new free radical on the sulfur, which is capable of initiating a new polymer chain.

Processes for the preparation of the preferred binders containing surface modifiers bonded to the surface of the cores comprise the steps a) application of at least one surface modifier, where at least one surface modifier contains at least one functional group, to cores dispersed in a solvent, and b) free-radical polymerisation in the presence of organic monomers, where the surface modifier containing at least one functional group applied in step a) functions as free-radical chain-transfer agent, c) if necessary work-up of the binder prepared in accordance with the invention by distillation, precipitation, solvent exchange, extraction or chromatography.

The surface modifier employed in the processes according to the invention particularly preferably contains at least one functional group selected from the group consisting of thiols, sulfides, disulfides and polysulfides.

In principle, all ways of initiating the free-radical polymerisation that are known to the person skilled in the art are suitable. The free-radical polymerisation is preferably initiated in a manner known to the person skilled in the art using AIBN or AIBN derivatives.

All process types known to the person skilled in the art are likewise suitable for carrying out the polymerisation. For example, the monomers and the free-radical initiator can be added in one step, which is the preferred embodiment. Furthermore, it is also possible for the monomers and the free-radical initiator to be added stepwise, for example with post-initiation and addition of the monomers in portions. It is furthermore also possible to modify the monomer composition stepwise in the course of the polymerisation, for example by time-controlled addition firstly of hydrophilic monomers, then hydrophobic monomers, or vice versa. This is possible, in particular, on use of a controlled free-radical polymerisation process known to the person skilled in the art.

The above-mentioned solvent or solvent mixture is selected from water, organic solvents and mixtures thereof. If the solvent mixture and monomers are selected in such a way that although the monomers are soluble, the polymers formed therefrom are, however, no longer soluble from a certain chain length, the binders according to the invention precipitate out of the reaction mixture. The precipitated binders can be separated off from the free polymer present in the reaction medium or from unreacted surface modifiers. This can be carried out by standard methods known to the person skilled in the art. In a preferred embodiment, the polymerisation is carried out in a solvent or solvent mixture in which the monomers are soluble, but the polymers formed are insoluble from a certain chain length. The binders consequently precipitate out of the reaction solution. Residual monomers and any unreacted reagents still in solution during the production of the cores or the functionalisation thereof or dissolved by-products can be separated off easily, for example by filtration.

In another process, phase separation is induced at a certain point in time by an external trigger, such as, for example, a change in temperature, addition of salt or addition of a non-solvent. The binder synthesis can thus be interrupted at any desired points in time, in order, for example, to control the surface coverage.

The binders according to the invention can be employed alone or as a mixture with free polymers.

The cores with radially bonded oligomers and/or polymers obtainable from the above-mentioned processes are particularly suitable for use as binders, as described above. The present invention likewise relates to the use of the binders according to the invention in formulations, surface coatings (preferably varnishes), inks, foams, adhesives, encapsulation materials and plastics or in precursors thereof. Particular preference is given to the use as surface-coating raw material in solvent- and water-containing surface coatings, and in powder coatings. In the said applications, the improvement in the scratch resistance and chemical resistance of varnishes (for example in commercially available powder coatings, UV-curing surface coatings, dual cure surface coatings) and plastics, such as, for example, polycarbonate or PMMA, can be achieved, for example.

Other applications relate, for example, to transparent weather protection or transparent colouring of surface coatings and plastics comprising functional nanoparticles.

In the said uses, the binders according to the invention serve as replacement for conventional binders. In the property as binder, they already incorporate the known advantages of nanoadditives.

The novel binders hardly differ in appearance from conventional binders. On use, they can be dissolved, for example, using standard surface-coating solvents and redried without irreversible crosslinking occurring. Furthermore, the handling and processing of the binders according to the invention correspond to those of conventional binders. Difficulties which exist in the preparation of nanocomposites in accordance with the prior art (dispersion effort, handling of powders) do not arise.

The viscosity of the binders according to the invention is significantly reduced compared with the viscosity of conventional binders of the same molecular weight since instead of one long chain, a plurality of shorter chains emanate from a central point. This is particularly advantageous in the case of the formulation of high solids and particularly in the case of very high solids surface coatings, which have to manage with a very low solvent content. In the case of conventional polymers, short-chain polymers and reactive thinners, which impair the mechanical properties, have to be employed here. The novel class of binders thus enables the use of reactive thinners to be reduced.

The lower viscosity observed in the case of the binders according to the invention can be clearly shown by the following illustrative comparison:

a) diagrammatic representation of a conventional binder of a polymer having 30 monomer units

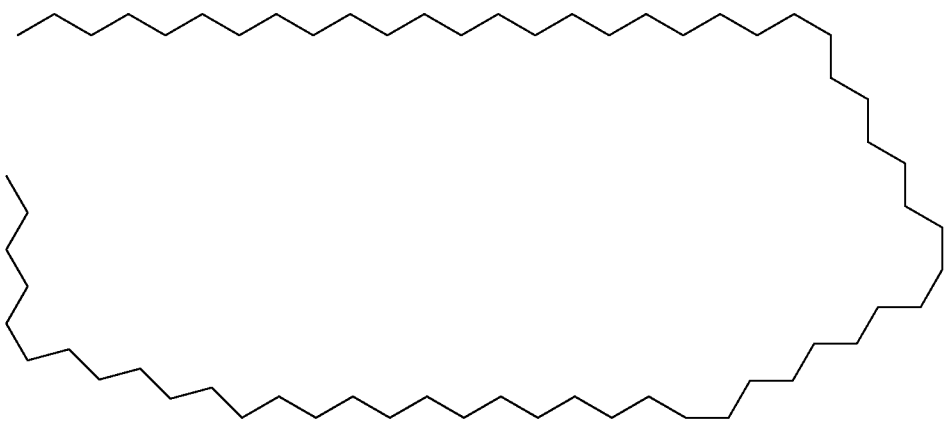

b) diagrammatic representation of a binder according to the invention having 30 monomer units, radially bonded to a core

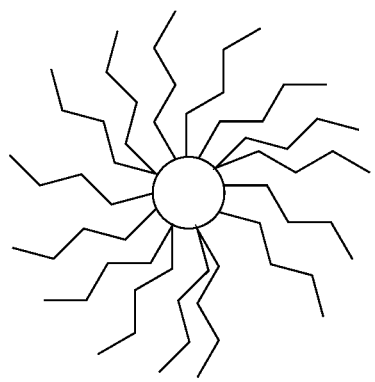

The diagrammatic representation of a direct comparison between a polymer having 30 monomer units (corresponding to an average molecular weight of about 3000-4000 g/mol) and a core-bridged nanohybrid binder according to the invention, likewise having 30 monomer units, shows that the long, linear polymer chain will have a higher viscosity than the approximately spherical shape of the binder according to the invention, which in addition may also exhibit Newtonian behaviour.

The binders according to the invention are particularly suitable for use in varnishes or adhesives. The nanoparticle-bonded binders can also and in particular be employed in the area of powder coatings. The reduced viscosity enables better flow and thus better surface quality.

An important side effect in this alternative binder approach is possible incorporation of further functions into the surface-coating matrix by means of the nanoparticle core. Thus, electromagnetic rays can be influenced (UV absorption, IR absorption), catalytic effects can be exerted, inorganic coloured nanopigments can be utilised or, for example, nanophosphors can be used as inorganic core. Thus, the present invention likewise relates to the use of the binders according to the invention as opacifiers for short-wave radiation in inks, foams, adhesives, encapsulation materials and plastics or in precursors thereof.

In the said uses, the binders according to the invention can be present together with surface-modified particles having a diameter of <1 μm, which are homogeneously distributed or are in the form of a gradient in a cured coating material.

The present invention likewise relates to formulations, surface coatings, inks, foams, adhesives, encapsulation materials and plastics comprising binders in accordance with the present invention.

The following examples merely illustrate the invention without restricting the scope of protection. In particular, the features, properties and advantages described therein of the defined compound(s) on which the relevant example is based can also be applied to other substances and compounds which are not described in detail, but fall within the scope of protection of the claims, unless indicated otherwise elsewhere.

EXAMPLES

Example 1 a) Preparation of a Silyl-Terminated Polyacrylate 130 ml of methyl methacrylate, 170 ml of n-butyl acrylate, 32.5 ml of 2-hydroxyethyl methacrylate and 38 ml of 3-mercaptopropyltrimethoxysilane are dissolved successively in 1.5 l of THF. 5 g of azobisisobutyronitrile are added to the mixture, which is warmed at 60° C. for 6 hours. The solvent is removed in a rotary evaporator, giving the polymer containing reactive silyl end groups as a colourless product.

b) Alkali-Catalysed Condensation to Give the Binder 100 g of the polymer prepared in a) are dissolved in 500 ml of toluene.

50 ml of 25% aqueous ammonia solution are added. The mixture is warmed at 60° C. for 4 h with vigorous mixing.

Water and toluene are removed in a rotary evaporator, and the residue is taken up in 500 ml of butyl acetate, giving a colourless, transparent solution of the binder in butyl acetate.

Example 2

Preparation of Terminally Silyl-Modified Polyacrylate Polyols 250 ml of isopropanol are added to a monomer mixture consisting of n-butyl acrylate, methyl methacrylate and 2-hydroxyethyl methacrylate (HEMA). After addition of the chain-transfer agent 3-mercaptopropyltrimethoxysilane (MPTMS) and azobisisobutyronitrile (AIBN), nitrogen is passed through the reaction mixture for 10 min. The mixture is then heated at 60° C. for 16 h. After the reaction time, the polymerisation batches are allowed to cool to room temperature and dried in a rotary evaporator and subsequently overnight in a fine vacuum. The following batches are carried out by this procedure:

TABLE 1

Polymerisation batches with different concentrations of the chain-transfer agent.

| | nBuAc [ml] | MMA [ml] | HEMA [ml] | MPTMS [μl] | AIBN [g] |
|---|---|---|---|---|---|
| 1 | 13 | 9.6 | 2.4 | — | 1.0 |
| 2 | 13 | 9.6 | 2.4 | 10 | 1.0 |
| 3 | 13 | 9.6 | 2.4 | 100 | 1.0 |
| 4 | 13 | 9.6 | 2.4 | 500 | 1.0 |
| 5 | 13 | 9.6 | 2.4 | 930 | 1.0 |

Example 3

Modification of $SiO_2$ Nanoparticles Using Silane-Terminated Polymers from Example 2 by the "Grafting-to" Process Starting from a 5% by weight dispersion of $SiO_2$ nanoparticles in isopropanol (HIGHLINK, Clariant), the polymers prepared in 1 are employed for surface modification in accordance with Table 2. The reaction mixtures are heated under reflux here for 16 h.

TABLE 2

Modification of $SiO_2$ nanoparticles

| Terpolymer | Polymer per gram of $SiO_2$ [g] |
|---|---|
| 2 | 2 |
| 3 | 2 |
| 4 | 2 |
| 5 | 2 |

After cooling, the isopropanol is removed in a rotary evaporator, and the solid which remains is dispersed in a surface-coating solvent (for example butyl acetate).

Example 4

Binder Synthesis

Terminally silyl-modified polymers are prepared by the synthetic procedure of Example 2, with the difference that the final step (removal of the solvent in vacuo) is omitted. Instead, 10 g of $NH_3$ solution (20% by weight) are in each case added to the reaction mixtures, which are still warm at 60° C., and stirring is continued at 60° C. for a further 2 h. 250 g of butyl acetate are subsequently added, and the solvent is removed in a rotary evaporator until a solution of 30% by weight of the binder in butyl acetate is obtained.

Example 5

Binder Synthesis 166.66 g of ion-exchanged silica sol (Levasil 300-30%, corresponding to 50.0 g of $SiO_2$) are diluted to 5% by weight of SiO$_2$ using 833.34 g of isopropanol (total batch=1000 g), and 3.91 g of 3-mercaptopropyltrimethoxysilane are added. After stirring for 12 h, the following are added to the mixture:
HEMA (hydroxyethyl methacrylate): 25 g
MMA (methyl methacrylate): 125 g
BuMA (butyl acrylate): 150 g
AIBN (azobisisobutyronitrile): 7 g The reaction mixture is stirred at 70° C. for 12 h. 300 g of butyl acetate are subsequently added, and isopropanol, water and butyl acetate are distilled off in vacuo until a dispersion of 50% by weight of binder solid in butyl acetate is obtained.

The invention claimed is:

1. A binder, comprising cores having a diameter of >1 nm with radially bonded oligomers and/or polymers, which are covalently bonded to the surface of the cores, wherein the cores are based on sulfates or carbonates of alkaline-earth metal compounds or on oxides or hydroxides of silicon, titanium, zinc, aluminium, cerium, cobalt, chromium, nickel, iron, yttrium or zirconium or mixtures thereof, which may optionally be coated with metal oxides or hydroxides, or on metals coated with metal oxides or hydroxides.

2. A binder according to claim 1, wherein the proportion of oligomers and/or polymers in the binder is 40 to 99% by weight, based on the binder.

3. A binder according to claim 1, wherein the cores are inorganic or organic or comprise a mixture of inorganic and organic constituents.

4. A binder according to claim 1, wherein the cores are based on sulfates or carbonates of alkaline-earth metal compounds or on oxides or hydroxides of silicon, titanium, zinc, aluminium, cerium, cobalt, chromium, nickel, iron, yttrium or zirconium or mixtures thereof, which are coated with metal oxides or hydroxides.

5. A binder according to claim 1, wherein the cores are SiO$_2$ particles or ZnO or cerium oxide particles or TiO$_2$ particles, which are optionally coated with metal oxides or hydroxides.

6. A binder according to claim 1, wherein the cores are selected from the group consisting of three-dimensionally crosslinked organo-silsesquioxane structures and metal oxides/hydroxides.

7. A binder according to claim 1, wherein the cores have diameters, determined by particle correlation spectroscopy or a transmitting electron microscope, of 1 to 20 nm in at least one dimension.

8. A binder according to claim 1, wherein the surface of the cores has been modified by at least one surface modifier.

9. A binder according to claim 8, wherein the at least one surface modifier contains at least one functional group selected from the group consisting of thiols, sulfides, disulfides and polysulfides.

10. A binder according to claim 8, wherein the surface modifiers are selected from the group consisting of organofunctional silanes, quaternary ammonium compounds, carboxylic acids, phosphonates, phosphonium, sulfonium compounds and mixtures thereof.

11. A binder according to claim 1, wherein the oligomers and/or polymers are selected from the group consisting of poly(meth)acrylates, polyesters, polyurethanes, polyureas, silicones, polyethers, polyamides, polyimides and hybrids thereof.

12. A process for preparing a binder according to claim 1, comprising dispersing the cores having a diameter of >1 nm in a solvent or solvent mixture and polymerizing in the presence of organic monomers.

13. A process according to claim 12, comprising
a) applying at least one surface modifier, where the at least one surface modifier contains at least one functional group, to cores dispersed in a solvent, and
b) free-radical polymerizing in the presence of organic monomers, where the surface modifier containing at least one functional group applied in a) functions as free-radical chain-transfer agent,
c) optionally work-up the binder by distillation, precipitation, solvent exchange, extraction or chromatography.

14. A process according to claim 13, wherein the functional group is selected from the group consisting of thiols, sulfides, disulfides and polysulfides.

15. A process for preparing a binder according to claim 1, comprising
a) preparing or providing oligomers and/or polymers containing a group which is reactive towards a core material,
b) dispersing the cores having a diameter of >1 nm in a solvent or solvent mixture in which the oligomers and/or polymers from a) are at least partially soluble,
c) reacting the oligomers and/or polymers from a) with the cores from b), where the oligomers and/or polymers are radially bonded to the cores,
d) optionally work-up the binder by distillation, precipitation, solvent exchange, extraction or chromatography.

16. A process for preparing a binder according to claim 1, comprising
a) preparing or providing oligomers and/or polymers containing a hydrolyzable and condensable organosilicon and/or organometallic group,
b) hydrolysing and condensating the hydrolyzable and condensable organosilicon and/or organometallic group, where cores with oligomers and/or polymers bonded thereto form, where the oligomers and/or polymers are radially bonded to the cores formed,
c) optionally work-up the binder by distillation, precipitation, solvent exchange, extraction or chromatography.

17. A process according to claim 12, wherein the solvent or solvent mixture is selected from the group consisting of water, organic solvents and mixtures thereof.

18. A product selected from the group consisting of formulations, surface coatings, inks, foams, adhesives, encapsulation materials and plastics and precursors thereof, comprising a binder according to claim 1 and a carrier suitable for said product.

19. A method of opacifying short-wave radiation in a product selected from the group consisting of inks, foams, adhesives, encapsulation materials, plastics and precursors thereof, comprising adding to said product a binder according to claim 1.

20. A method according to claim 19, wherein the binder is present together with surface-modified particles having a diameter of <1 μm, which are homogeneously distributed or are in the form of a gradient in a cured coating material.

21. A binder, comprising cores having a diameter of >1 nm with radially bonded oligomers and/or polymers, which are covalently bonded to the surface of the cores,
and wherein
the cores are SiO$_2$ particles or ZnO or cerium oxide particles or TiO$_2$ particles, which are optionally coated with metal oxides or hydroxides; or
the cores are selected from the group consisting of three-dimensionally crosslinked organo-silsesquioxane structures and metal oxides/hydroxides.

* * * * *